US008423231B2

(12) United States Patent
Breuer et al.

(10) Patent No.: US 8,423,231 B2
(45) Date of Patent: Apr. 16, 2013

(54) DRIVER ASSISTANCE SYSTEM

(75) Inventors: Karsten Breuer, Lauenau (DE); Guido Hoffmann, Burgwedel (DE)

(73) Assignee: WABCO GmbH, Hannover (DE)

( * ) Notice: Subject to any disclaimer, the term of this patent is extended or adjusted under 35 U.S.C. 154(b) by 220 days.

(21) Appl. No.: 12/992,014

(22) PCT Filed: Feb. 24, 2009

(86) PCT No.: PCT/EP2009/001280
§ 371 (c)(1),
(2), (4) Date: Jan. 4, 2011

(87) PCT Pub. No.: WO2009/141025
PCT Pub. Date: Nov. 26, 2009

(65) Prior Publication Data
US 2011/0166746 A1    Jul. 7, 2011

(30) Foreign Application Priority Data
May 23, 2008 (DE) .......................... 10 2008 024 929

(51) Int. Cl.
*G06F 7/00* (2006.01)
*G07C 5/00* (2006.01)
(52) U.S. Cl.
USPC ............ 701/29.2; 701/70; 340/435; 340/436; 340/437; 340/901; 340/902
(58) Field of Classification Search ............ 701/70, 701/29.2; 340/435–438, 901–905
See application file for complete search history.

(56) References Cited

U.S. PATENT DOCUMENTS

| 6,169,478 | B1 * | 1/2001 | Hada et al. ..................... 340/435 |
| 6,415,230 | B1 * | 7/2002 | Maruko et al. ................ 701/301 |
| 7,136,750 | B2 * | 11/2006 | Takahama et al. ............ 701/408 |
| 7,453,374 | B2 * | 11/2008 | Koike et al. .................... 340/903 |
| 2004/0164851 | A1 * | 8/2004 | Crawshaw .................... 340/435 |
| 2007/0046449 | A1 | 3/2007 | Koike et al. |
| 2009/0015391 | A1 * | 1/2009 | Kiribayashi ................. 340/436 |

FOREIGN PATENT DOCUMENTS

| DE | 19704890 A1 | 8/1998 |
| DE | 19856823 A1 | 6/1999 |
| DE | 10251039 A1 | 5/2004 |
| DE | 102005005720 A1 | 8/2006 |

* cited by examiner

Primary Examiner — Thomas Tarcza
Assistant Examiner — Tyler J Lee
(74) Attorney, Agent, or Firm — Kramer Levin Naftalis & Frankel LLP

(57) ABSTRACT

A driver assistance system includes a speed detector, a preceding vehicle detector having at least one video camera and at least one distance sensor for detecting the distance from a preceding vehicle, a device for determining the speed of the preceding vehicle, and an electronic control unit equipped to trigger an autonomous deceleration of the vehicle with the presence of predetermined brake trigger driving data and to terminate the autonomous deceleration with the presence of predetermined brake abortion driving data. The control unit effects: redundant detection of preceding vehicle driving data, and non-redundant detection of preceding vehicle driving data if a redundant detection is not possible. The non-redundantly detected preceding vehicle driving data is compared to preceding vehicle driving data redundantly detected within a predetermined time, and the non-redundantly detected data is used to control the autonomous deceleration if it corresponds to the redundantly detected data.

5 Claims, 1 Drawing Sheet

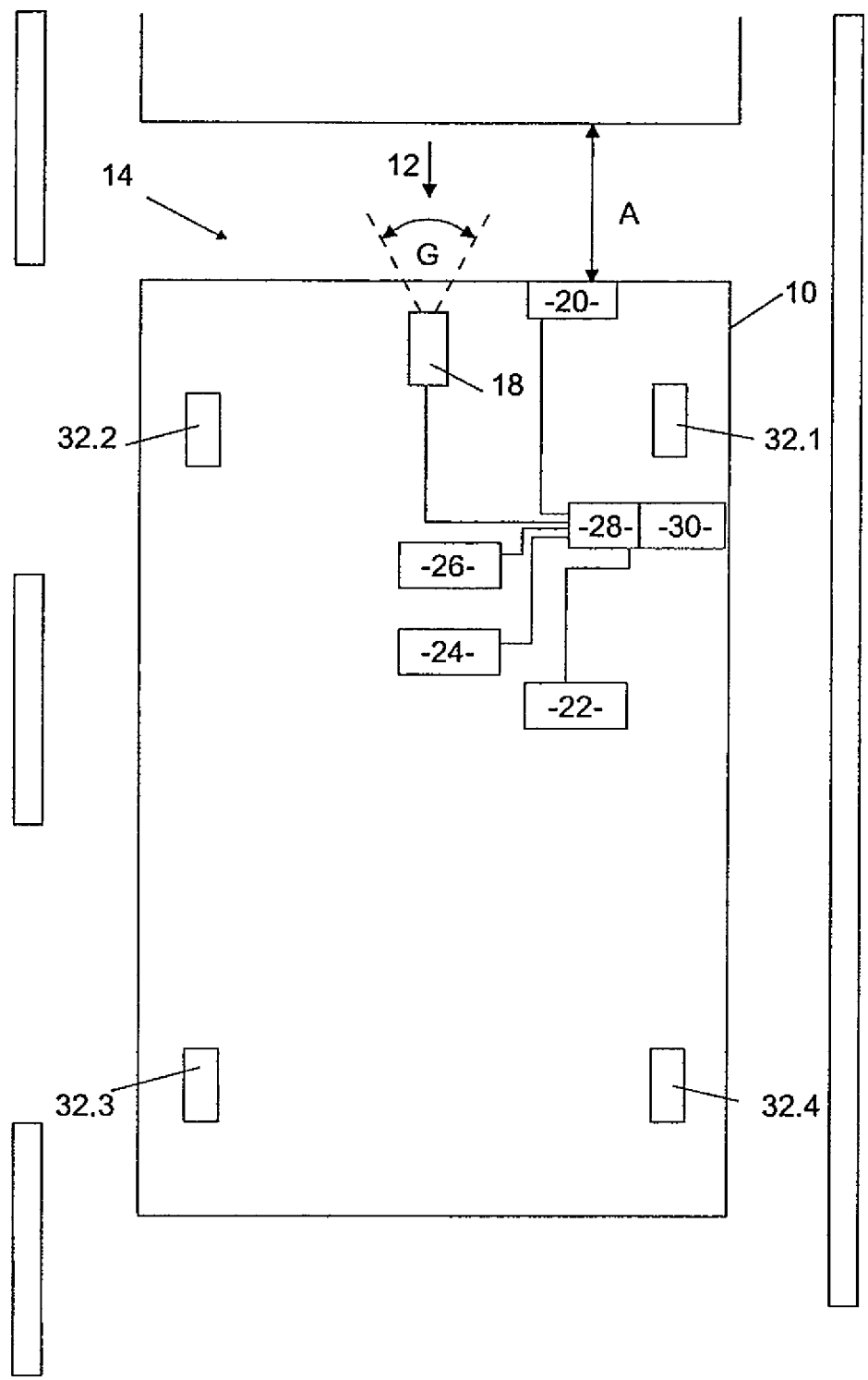

DRIVER ASSISTANCE SYSTEM

FIELD OF THE INVENTION

The invention generally relates to a driver assistance system for a motor vehicle, that, according to various embodiments, utilizes (a) a speed detection device for detecting driving data in the form of a speed of the motor vehicle, (b) a preceding vehicle detection device that includes at least one video camera and at least one distance sensor, (c) a preceding vehicle speed determination device for determining the speed of the preceding vehicle and (d) an electronic actuation unit configured to trigger autonomous braking of the motor vehicle when predetermined brake trigger driving data are present, and to terminate autonomous braking of the motor vehicle when predetermined brake abort driving data are present.

BACKGROUND OF THE INVENTION

Driver assistance systems of the general type under consideration are known and serve to reduce the severity of an accident or entirely avoid an accident through autonomous braking of a motor vehicle, which can also be referred to as partial braking, just before an anticipated collision of the motor vehicle with a preceding vehicle. A preceding vehicle detection device is known for generating the necessary signals for triggering the autonomous braking.

A disadvantage with conventional driver assistance systems is that the autonomous braking is aborted if the preceding vehicle detection device no longer detects a preceding vehicle. It has become apparent that such driver assistance systems frequently terminate the autonomous braking too early, with the result that the risk of collision and the potential intensity of the accident increase.

SUMMARY OF THE INVENTION

Generally speaking, it is an object of the invention to overcome disadvantages associated with prior art constructions by means of an improved driver assistance system in which, according to various embodiments, the electronic actuation unit is configured to effect (i) redundant detection of preceding vehicle driving data of the preceding vehicle and (ii) in the event of component failure so that redundant detection of the preceding vehicle driving data becomes impossible, (a) non-redundant detection of the preceding vehicle driving data, (b) comparison of the non-redundantly detected preceding vehicle driving data with preceding vehicle driving data detected redundantly within a predefined time, and (c) if the non-redundantly detected preceding vehicle driving data correspond to the redundantly detected preceding vehicle driving data, use of the non-redundantly detected preceding vehicle driving data to check for the presence of brake trigger driving data and/or brake abort driving data.

An advantage of the claimed invention is that the driver assistance system can reliably bring the motor vehicle to a standstill even if, for example, the video camera can no longer detect the preceding vehicle because the motor vehicle is rolling and pitching too strongly and, as a result, redundant detection of preceding vehicle driving data fails.

Within the scope of the following description, a speed detection device is understood to be, in particular, a tachometer or tachograph. The speed detection device can alternatively or additively also be formed by a device of a brake system of the motor vehicle that determines the speed from wheel speeds.

A preceding vehicle detection device is understood, in particular, to be any sensor designed and provided for detecting a relevant preceding vehicle of the motor vehicle, that is, to identify this as a preceding vehicle or detect data therefrom, such as for example the distance from the motor vehicle.

Brake trigger driving data are understood, in particular, to be data that describe movement states of the motor vehicle in absolute or relative terms with respect to the preceding vehicle and in the presence of which autonomous braking is to be carried out. For example, driving data become brake trigger driving data if they are beyond a predetermined limiting value. If, for example, the continuously measured driving data item of the distance drops below a minimum distance so that autonomous braking is to be initiated, the corresponding distance becomes a brake trigger driving data item.

Brake abort driving data are understood, in particular, to be data in whose presence the autonomous braking is to be aborted.

Preceding vehicle driving data are understood, in particular, to be data that describe a movement state of the preceding vehicle in absolute or relative terms with respect to the motor vehicle. This may also include a preceding vehicle ID or the relative speed from the motor vehicle. The preceding vehicle driving data are also driving data.

The condition that the non-redundantly detected preceding vehicle driving data correspond to the redundantly detected preceding vehicle driving data is to be understood to mean, in particular, that the respective data differ from one another only by a predefined relative or absolute deviation.

The preceding vehicle detection device is preferably designed to detect relevant preceding vehicles. A relevant preceding vehicle is a preceding vehicle that is in the movement path of the motor vehicle.

An electronic actuation unit is understood to be, in particular, any computing unit that performs open-loop control on the assemblies of the motor vehicle or closed-loop control of a process. It is possible here, but not necessary, for the electronic actuation unit to be composed of a plurality of sub-units. It is therefore possible, for example, for all the driving data sensors referred to below or other sensors to have joined to them an evaluation unit that pre-processes measurement data and transmits it in encoded form to a main actuation unit.

It is also possible for the preceding vehicle detection device and preceding vehicle speed detection device to be combined in a single device. For the present invention, it is irrelevant how individual functionalities are divided up among assigned devices. It is therefore possible for the preceding vehicle detection device to determine so many data items that the preceding vehicle speed of the preceding vehicle can be determined therefrom. In this case, the preceding vehicle speed determination device is part of the preceding vehicle detection device.

For example, the preceding vehicle detection device can be configured to determine the distance of the motor vehicle from the preceding vehicle at regular time intervals, and to calculate a relative speed from the preceding vehicle from the change in the distance data over time. The preceding vehicle speed is therefore obtained as a vector sum from the speed and a relative speed between the motor vehicle and the preceding vehicle. In this case, the preceding vehicle speed determination device is part of the preceding vehicle detection device.

Redundant detection of the preceding vehicle driving data is understood to mean, in particular, that at least two components of the preceding vehicle detection device detect the preceding vehicle simultaneously, and that the preceding vehicle is detected. Failure of a component is understood to be, in particular, any event that leads to the component no longer supplying usable signals. This may be due, for example, to the component being destroyed or the motor vehicle rolling or pitching so strongly that the data obtained can no longer be evaluated.

A distance sensor is understood to be any device designed and arranged to determine a distance from a preceding vehicle. For example, the distance sensor can comprise a laser sensor and/or a radar sensor.

For example, when the distance sensor can also supply distance data, but the video camera has failed so that it is not ensured that the distance data relate to the preceding vehicle, the distance data detected by the distance sensor are not redundant.

The comparison of non-redundantly detected preceding vehicle driving data with preceding vehicle driving data that are detected redundantly within a predefined time is understood to mean, in particular, that a deviation between the two preceding vehicle driving data items is determined and compared with a predefined threshold value. If the two preceding vehicle driving data items deviate by, for example, less than 5% from one another, it is assumed that the distance sensor is still measuring the distance from the preceding vehicle and not, for example, the distance from another object. The predefined time may be, for example, less than a second. The preceding vehicle ID and the relative speed can also be used to assess whether the redundant detection of the preceding vehicle driving data has become impossible. Redundant detection can be considered to be possible if the preceding vehicle ID (identification number) of the detected object remains the same.

In one embodiment, the electronic actuation unit is designed to carry out a method that, when at least one of the components fails so that redundant detection of the preceding vehicle driving data becomes impossible but non-redundant detection is possible, carries out the additional steps of determining whether a last-detected distance of the preceding vehicle from the motor vehicle undershoots a predefined minimum distance, and if this is the case of suppressing an abort of the autonomous braking. Premature aborting of the autonomous braking is therefore avoided.

In other words, in situations in which redundant detection is not possible and there is already a high probability of the motor vehicle already being in a state of autonomous braking because the minimum distance from the preceding vehicle has been undershot, the autonomous braking continuous to be maintained. This prevents aborting of the autonomous braking simply because driving data are absent.

The predefined minimum distance is basically freely selectable. However, distances below 3 m, in particular of less than 2 m, are well suited.

In another embodiment, the electronic actuation unit is designed to additionally: (i) extrapolate the distance from the preceding vehicle and the preceding vehicle speed, and (ii) use the extrapolated distance and/or the extrapolated preceding vehicle speed as driving data for checking whether the predetermined brake trigger driving data and/or brake abort driving data are present, if all the components of the preceding vehicle detection device fail after the redundant detection of the preceding vehicle. The distance and the preceding vehicle speed are extrapolated, in particular, from earlier measurement data stored in a digital memory of the actuation unit.

In other words, the distance and the preceding vehicle speed are then used for checking whether the predetermined brake trigger driving data and/or brake abort driving data are present if, and only if, no other better (namely redundant) measurement data are present. As a result, a situation may arise in which the autonomous braking is not aborted even though it could be aborted, which would intrude on the driver's autonomy without reason. However, this disadvantage is more than made up for by the advantage that the autonomous braking is not aborted because only corresponding driving data are missing even though this gives rise to a greater severity of accident or even actually brings about an accident.

The electronic actuation unit is preferably embodied such that it suppresses the aborting of the autonomous braking until the motor vehicle comes to a standstill. Alternatively or additively, the suppression of the aborting of the autonomous braking ends when the preceding vehicle is detected redundantly and the driving data correspond to the brake abort driving data.

A motor vehicle having a driver assistance system according to the inventive embodiments is also contemplated. The motor vehicle may be, for example, a utility vehicle.

Still other objects and advantages of the present invention will in part be obvious and will in part be apparent from the specification.

The present invention accordingly comprises the features of construction, combination of elements, and arrangement of parts all as exemplified in the constructions herein set forth, and the scope of the invention will be indicated in the claims.

BRIEF DESCRIPTION OF THE DRAWING

The invention is explained in more detail below using an exemplary embodiment and with reference to the appended drawing, in which:

FIG. 1 is a schematic view of a motor vehicle equipped with a driver assistance system according to an embodiment of the present invention.

DETAILED DESCRIPTION OF THE PREFERRED EMBODIMENTS

FIG. 1 shows a motor vehicle 10, which has a front side 12 on which a preceding vehicle detection device 14 is arranged. The preceding vehicle detection device 14 is designed to detect a preceding vehicle 16 and has a first component in the form of a video camera 18 with a field of vision G and a second component in the form of a distance sensor 20. The distance sensor 20 is designed to measure a distance A between the front side 12 of the motor vehicle 10 and a rear side of the preceding vehicle 16.

The motor vehicle 10 also has a speed detection device 22 in the form of a tachometer, a yaw rate sensor 24 and a deceleration sensor 26. The preceding vehicle detection device 14, the speed detection device 22, the yaw rate sensor 24 and the deceleration sensor 26 are driving data sensors that detect driving data of the motor vehicle 10. These are all connected to an electronic actuation unit 28, for example by means of cables. The electronic actuation unit 28 comprises a digital memory 30 in which measurement data detected by the driving data sensors can be stored in a buffered fashion.

The distance sensor 20 functions, together with the speed detection device 22 and the electronic actuation unit 28, as a preceding vehicle speed determination device for determining a preceding vehicle speed $v_{vf}$. In order to determine the preceding vehicle speed $v_{vf}$, the distance sensor 20 measures the distance A at a time interval of, for example, 100 m/s and calculates therefrom a relative speed $v_{relative}$ between the motor vehicle 10 and the preceding vehicle 16. The relative speed $v_{relative}$ is added to a speed $v_K$ of the motor vehicle 10, so that the preceding vehicle speed $v_{vf}$ is obtained.

A process that continuously detects the distance values A from the distance sensor 20 runs on the electronic actuation unit. At the same time, image data are obtained from the video camera 18 and are examined by means of image recognition to determine whether a preceding vehicle 16 is present. If this is the case, a preceding vehicle ID is assigned to the preceding vehicle 16. At the same time, the respective distance A and the respective preceding vehicle speed $v_{vf}$ are linked to the preceding vehicle ID. The preceding vehicle ID, the distance and the preceding vehicle speed $v_{vf}$ are preceding vehicle data and also constitute driving data.

The electronic actuation unit 28 compares incoming data with brake trigger driving data stored in the digital memory 30. If sufficiently large correspondences are found, the electronic actuation unit 28 triggers autonomous braking of the motor vehicle 10 by sending an electrical brake signal to brakes 32.1, 32.2, 32.3, 32.4 via a bus line (not indicated), after which the brakes 32 brake the motor vehicle 10.

As long as the video camera 18 and the distance sensor 20 detect the preceding vehicle 16 as a vehicle that is driving in front of the motor vehicle 10, redundant detection of the preceding vehicle 16 occurs. That is, it can be assumed that the distance A is actually a distance from a preceding vehicle and not, for example, a distance from another object in front of the motor vehicle 10, for example a crash barrier. During the autonomous braking, a situation may arise in which the video camera 18 can no longer detect the preceding vehicle 16, for example because the relative movement between the motor vehicle 10 and the preceding vehicle 16 is so large that the image evaluation no longer succeeds in a stable fashion. In this case, the video camera 18 fails as a first component of the preceding vehicle detection device 14, but on the other hand the distance sensor 20 continues to supply distance data. In this case, the electronic actuation unit 28 determines whether a distance $A_{redundant}$ that was detected redundantly last is smaller than a predefined minimum distance $A_{min}$ of, for example, 2 m. If this is not the case, the distance $A_{redundant}$ detected last both by the video camera 18 and by the distance sensor 20 was therefore smaller than the minimum distance $A_{min}$ and an abort of the autonomous braking located in the profile is suppressed until either the motor vehicle 10 comes to a standstill or until a redundantly detected distance is determined again.

It is possible to accommodate a situation where autonomous braking is carried out and the video camera 14 can no longer detect the preceding vehicle 16, for example because the preceding vehicle 16 has approached the motor vehicle 10 so closely that detection is no longer possible. This can lead, for example, to a situation in which, on the basis of the data from the video camera 18, a further preceding vehicle ID is generated so that the impression is given that two objects are present even though they are both the preceding vehicle 16. In this case, a preceding object is detected by the distance sensor 20 and the electronic actuation unit 28 assigns a preceding object ID to these data items. It is then continuously determined whether these preceding object data items correspond to the preceding vehicle data. This is to be understood as meaning that the preceding object data that cannot be reliably assigned to a real object are compared with those redundantly detected preceding vehicle data items that have been detected previously. If a sufficiently high degree of similarity is detected, the preceding object data are used as driving data for checking whether the predetermined brake abort driving data are present. In other words, it is assumed that the preceding object detected by the distance sensor 20 continues to be the preceding vehicle 16. The driving data determined for this object are then used for the comparison with the predetermined brake abort driving data.

If the electronic actuation unit 28 does not receive from the video camera 18 and the distance sensor 20 any data that permit determination of the distance A, the actuation unit 28 extrapolates the distance A and the preceding vehicle speed $v_{vf}$ by means of the data measured last. The driving data extrapolated in this way are then compared with the predetermined brake abort driving data and the autonomous braking is aborted, if appropriate.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A driver assistance system for a motor vehicle, comprising:
    a speed detector for detecting a speed of the motor vehicle;
    a preceding vehicle detector having at least one video camera and at least one distance sensor for detecting a distance between the motor vehicle and a preceding vehicle driving in front of the motor vehicle, the distance forming a part of preceding vehicle driving data;
    a preceding vehicle speed determination device for determining a preceding vehicle speed of the preceding vehicle forming a part of the preceding vehicle driving data; and
    an electronic actuation unit configured to:
    (i) trigger autonomous braking of the motor vehicle when predetermined brake trigger driving data are present,
    (ii) terminate autonomous braking of the motor vehicle when predetermined brake abort driving data are present, and
    (iii) effect;
    (a) redundant detection of the preceding vehicle driving data,
    (b) non-redundant detection of the preceding vehicle driving data when redundant detection of the preceding vehicle driving data is not possible,
    (iii) a comparison of the non-redundantly detected preceding vehicle driving data with preceding vehicle driving data detected redundantly within a predefined time, and
    (iv) when the non-redundantly detected preceding vehicle driving data correspond to the redundantly detected preceding vehicle driving data, use of the non-redundantly detected preceding vehicle driving data to determine whether the predetermined brake trigger driving data or the predetermined brake abort driving data are present.

2. The driver assistance system as claimed in claim 1, wherein, in the event of failure of at least one of the at least one video camera and the at least one distance sensor, the electronic actuation unit is configured to (i) determine whether a last-detected distance of the preceding vehicle from the motor vehicle undershoots a predefined mean distance, and (ii) when the last-detected distance undershoots the predefined mean distance, suppress termination of the autonomous braking.

3. The driver assistance system as claimed in claim 1, wherein, in the event of failure of the at least one video camera and the at least one distance sensor after redundant detection of the preceding vehicle driving data, the electronic actuation unit is configured to extrapolate the distance from the preceding vehicle and the preceding vehicle speed, and use at least one of the extrapolated distance and the extrapolated preceding vehicle speed to determine whether the predetermined brake trigger driving data or the predetermined brake abort driving data are present.

4. The driver assistance system as claimed in claim 1, wherein the electronic actuation unit is configured to detect failure of at least one of (i) the at least one video camera and (ii) the at least one distance sensor by detecting whether the at least one video camera outputs signals and does not detect the preceding vehicle.

5. A motor vehicle, comprising a driver assistance system as claimed in claim 1.

* * * * *

UNITED STATES PATENT AND TRADEMARK OFFICE
CERTIFICATE OF CORRECTION

PATENT NO.         : 8,423,231 B2                                                      Page 1 of 1
APPLICATION NO.    : 12/992014
DATED              : April 16, 2013
INVENTOR(S)        : Breuer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 261 days.

Signed and Sealed this
Eighth Day of September, 2015

Michelle K. Lee
*Director of the United States Patent and Trademark Office*